Jan. 28, 1941.    P. WURZBURGER    2,230,098
COUPLING FOR TUBES AND PIPES
Filed Dec. 16, 1939    2 Sheets-Sheet 1

INVENTOR
PAUL WURZBURGER
BY
Cooper, Kerr & Dunham
ATTORNEYS

Jan. 28, 1941.　　P. WURZBURGER　　2,230,098
COUPLING FOR TUBES AND PIPES
Filed Dec. 16, 1939　　2 Sheets-Sheet 2
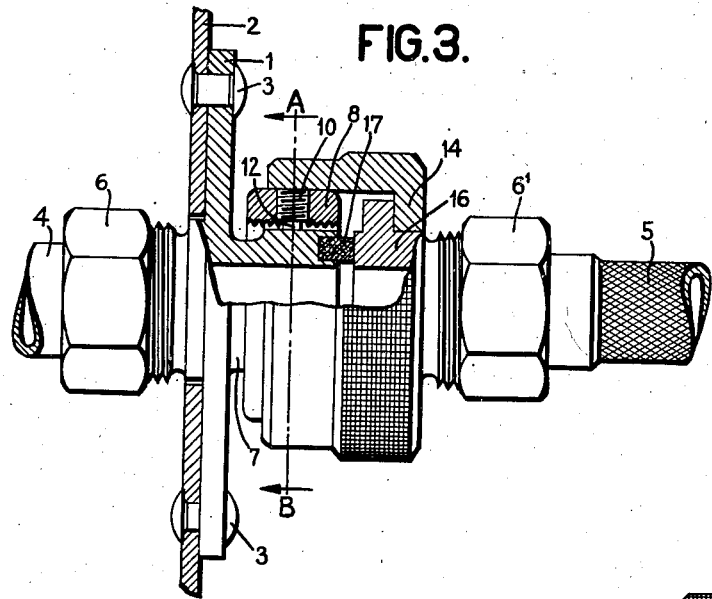
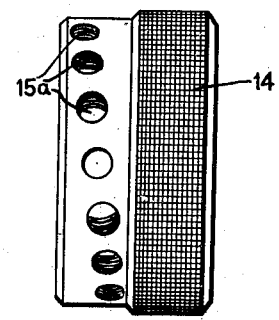
FIG.6.
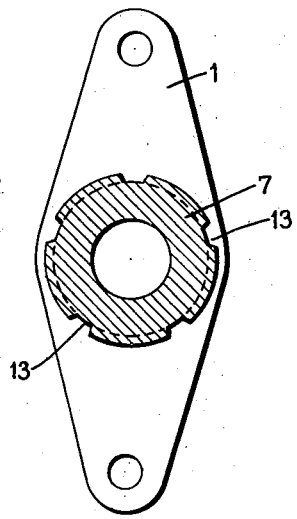
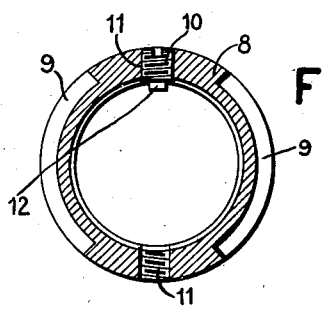
INVENTOR
*PAUL WURZBURGER*
BY
*Cooper, Kerr & Dunham*
ATTORNEYS Patented Jan. 28, 1941

2,230,098

UNITED STATES PATENT OFFICE 2,230,098

COUPLING FOR TUBES AND PIPES

Paul Wurzburger, Neuilly-sur-Seine, France, assignor to Patex Societe Anonyme, Basel, Switzerland, a corporation of Switzerland Application December 16, 1939, Serial No. 309,570
In France June 30, 1938

4 Claims. (Cl. 285—175)

This invention relates to unions which may be quickly and easily disconnected and more particularly relates to improvements in unions in which assembly is effected by means of dogs or pins which slide in grooves or skews in another part.

One object of the present invention resides in providing such a quickly disconnectible union with improvements to enable the degree of tightness to be regulated thereby enabling a tight joint to be secured irrespective of the pressure and irrespective of the fluid piped through the union.

Unions made according to the present invention are characterized in that the skews or grooves with which the dogs or pins engage are machined into an independent part which may be axially displaced to any desired extent. Accordingly, the degree of tightness of the union may be regulated and the dog part may be forced more or less vigorously against the seat. Such seat may be a plastic or elastic joint such as a compressible gasket. Preferably the skew part is connected by a screw thread to the union nipple and it may be fastened in suitable position on the nipple by means of a lock screw which engages in grooves in the nipple.

A further characteristic and object of the present invention resides in the provision of a construction wherein the skew part may be machined from a material that has higher mechanical strength than that of the material of the cooperating nipple. Accordingly, light weight high quality material can be employed for the nipples. Such materials would wear and deteriorate too rapidly if the skew joints were machined directly therein.

A further object of the present invention resides in the provision of an improved union which includes sealing elements adapted to be drawn together by dogs which engage skewed slots or grooves in a member and wherein means are provided to enable the initial axial position at which the dogs engage the skew slots to be adjusted, whereby tightness of the union may be regulated and adjusted as desired.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Fig. 3 is a view similar to Fig. 1 but with certain parts shown in central cross-section;

Fig. 4 is a sectional view taken along line AB of Fig. 3, but with the skew part removed;

Fig. 5 is a sectional view taken along line AB of Fig. 3 showing the skew part by itself; and Fig. 6 is a detail view of a modified form of clamping ring.

Figure 1:
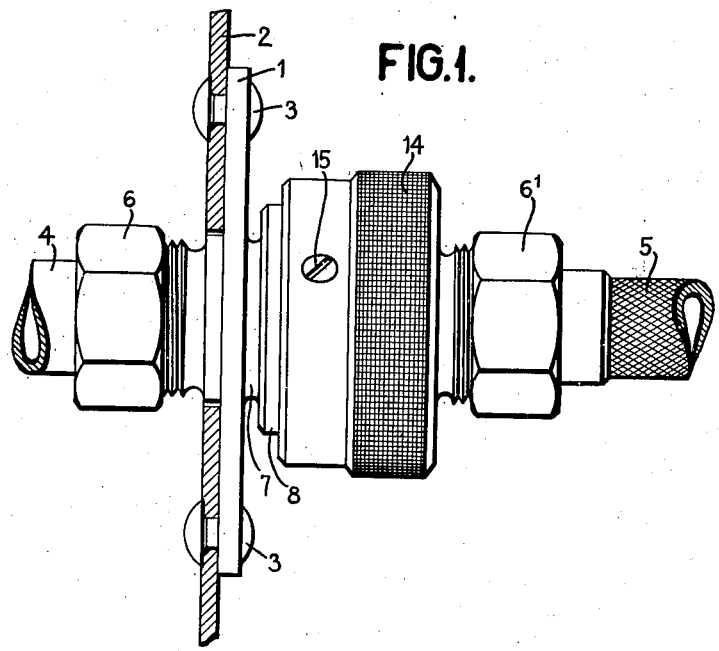
Figure 1 is an elevational view of an assembled and tightened union.

In more detail the union shown in Figs. 1 to 4 is preferably provided with a flange or fitting part 1 which enables it to be fastened to a partition, or wall 2 by means of rivets 3. Such a union may be used to connect a tube 4 to a pipe 5. Such tube 4 and pipe 5 are connected in a well known way to the union parts as by tightening nuts 6 and 6'. While a flanged type of union has been illustrated, the invention is not limited to such forms since the improvements may be applied to any type of union and to assemble any combination of rigid tubes or flexible pipes.

The union comprises a nipple 7 which is threaded (see Fig. 3) to enable a skew part 8 to be screwed thereon. The skew part 8 is provided with grooves or skew slots 9 (see Fig. 2). The grooves or skew slots are of helicoidal form and their pitch is suited to the nature of the joint, to its dimensions and to the pressure which is to be maintained against leakage by the union.

To enable the skew part to be locked at various axial positions along the nipple a locking or set screw 10 is provided adapted to be disposed in either of two tapped holes 11 in the skew part which holes are preferably 180 degrees apart. The tip 12 of such set screw engages in one of a plurality of grooves 13 in the nipple. As shown in Fig. 4 there are a plurality of such grooves 13 which extend lengthwise along the nipple 7. Accordingly, the skew part may be adjusted axially in or out on the nipple by screwing or unscrewing it thereon and thereafter it may be locked in the desired position by placing the set screw 10 in a selected hole 11 and engaging the tip 12 of the set screw in one of the grooves 13.

Figure 2:
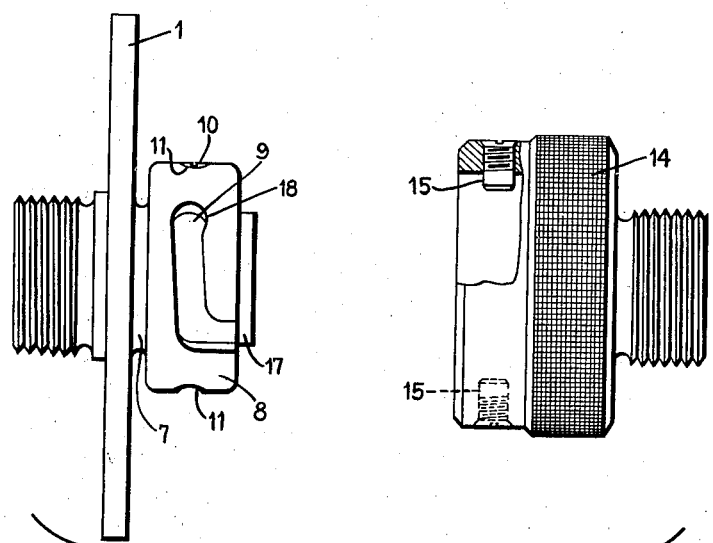
Fig. 2 shows the same parts disconnected with certain of the parts shown in partial section.

The clamp ring 14 which is preferably knurled on the outside is provided on its inside with inwardly projecting dogs or pins 15 (see Fig. 2). Disposed within the clamping ring is a connecting element 16 (Fig. 3) which extends outwardly for connection with a tube or pipe 5. Connection may be effected by means of the nut 6' which cooperates with threads on the outer end of 16. The connecting element cannot slip out and become disassembled from the clamping ring, being held in position by the dogs or pins 15 and by the outer flange of the clamping ring. The dogs 15 are preferably screwed into part 14. It will be understood that there are a pair of such dogs, each being adapted to cooperate with the related skew slot 9 on part 8.

The nipple 7 may be provided with a plastic or elastic packing or gasket 17 against which the connecting element 16 is forced upon tightening up to thereby afford a tight joint.

The novel added part 8 comprises skews or grooves 9 of special form. As shown in Fig. 2 it will be noted that these skews or skewed grooves are of helicoidal form and that their ends are slightly offset relatively to their center lines to provide locking recesses for the cooperating dogs or pins 15. Accordingly, even under vibration and under the elastic effect of the packing the dog part 14 will not become accidentally disconnected.

Connection is effected in the following manner:

After the tubes or pipes 4 and 5 have been connected in a known manner to the nipple 7 and to the connecting element 16, the assembler engages the dogs 15 in the grooves 9 of the skew part 8.

Because of the helicoidal form of the skew grooves, it will be readily understood that a simple rotary movement of the clamp ring 14 will be converted into a helicoidal movement of such part. The axial component of this movement causes part 16 to be forced vigorously against the nipple 7, or preferably against the packing or gasket 17.

When the dogs 15 of the clamp ring reach the end of their travel, they are subjected to a slight rearward movement by reason of the elasticity of the joint 17 and the particular shape of the ends of each of the skews or grooves. After such movement the offset milling 18 acts as a catch or latch forming a holding element for part 14 so that it is secured and does not become displaced even when subjected to vibrations.

The degree to which the connecting element 16 may be tightened against the nipple 7 or against the gasket 17 is a function of and coordinated to the relative initial axial position of the skewed part 8 on the nipple 7. The degree of tightness of the union may therefore be varied by initially suitably displacing the skewed part 8 axially on the nipple and locking it by the lock screw 10, whose tip enters into one of the grooves 13 of the nipple 7. This arrangement provides a desirable means for easily counteracting the wear on the joint 17. It also enables the degree of tightness to be adjusted for the proper amount to seal the union for any pressure of the liquid conducted therethrough.

In use, the skewed part 8 is the element of the union which is most subject to wear. It may therefore be made of a strong and wear resisting material. The nipple 7 on the other hand may be made of any other less strong material. In fact this part may be made of a light alloy which is a material too weak for grooves or skews of sufficient strength to be milled therein. In this way it is possible to provide very light unions which are also both durable and wear resisting.

From the foregoing it will be understood that the nipple 7 comprises one sealing element and the part 16 comprises the other sealing element of the union and that means are provided for variably adjusting the initial axial position at which the dogs are adapted to engage the skew slots. While according to the preferred embodiment of the invention such adjustment is secured by initially shifting the skewed part 8 relatively to the nipple or sealing element 7, such adjustment could be obtained by arranging the dogs 15 in such a manner that they may be placed in variable axial positions upon the clamping ring 14. In such case the part 8 would be axially fixed initially upon the nipple 7 or even be made integral therewith. One manner of providing for the selective variable axial positioning of the dogs with respect to the clamping ring would be to provide a plurality of tapped holes 15a disposed at different axial positions in and with respect to the ring 14 to receive such dogs (see Fig. 6).

What I claim is:

1. A quick detachable joint for a pair of coupling elements comprising a pair of sleeves provided with a bayonet slot and lug connection, a yieldable seal interposed between the opposed ends of said elements, one of said sleeves having a threaded connection with one of said elements, means for locking said sleeve to said element in any one of a plurality of adjusted positions, the other of said sleeves overlying said locking means when the parts are in assembled relationship whereby the first mentioned sleeve may be adjusted when in disassembled relationship to compensate for varying conditions of said seal.

2. A quick detachable joint for a pair of coupling elements comprising a pair of sleeves provided with a bayonet slot and lug connection, a yieldable seal interposed between the opposed ends of said elements, one of said elements having external threads thereon, one of said sleeves having a threaded connection witht said element, said threads being interrupted by a groove extending transversely thereof, and means cooperating with said groove and said sleeve for locking said sleeve to said element in any one of a plurality of adjusted positions, whereby said sleeve may be adjusted to compensate for varying conditions of said seal.

3. A quick detachable joint for a pair of coupling elements comprising a pair of sleeves provided with a bayonet slot and lug connection, a yieldable seal interposed between the opposed ends of said elements, one of said elements having external threads thereon, one of said sleeves having a threaded connection with said element, said threads being interrupted by a plurality of grooves extending transversely thereof, said grooves being spaced by an angle of less than 180°, said sleeve having a plurality of openings therein for reception of a set screw for locking said sleeve to said element in any one of a plurality of adjusted positions, whereby said sleeve may be adjusted to compensate for varying conditions of said seal.

4. A quick detachable joint for a pair of coupling elements comprising a pair of sleeves provided with a bayonet slot and lug connection, a yieldable seal interposed between the opposed ends of said elements, one of said sleeves having a plurality of threaded openings differently spaced from its ends for reception of a bayonet lug in a selected position, whereby the relative positions of the parts may be adjusted to compensate for varying conditions of said seal.

PAUL WURZBURGER.